(12) United States Patent
Rumpp

(10) Patent No.: US 6,302,617 B1
(45) Date of Patent: Oct. 16, 2001

(54) COUPLING DEVICE FOR A VEHICLE

(75) Inventor: Gerhard Rumpp, Schomstrasse 2, Inning, D-82266 (DE)

(73) Assignee: Gerhard Rumpp (DE)

( * ) Notice: Subject to any disclaimer, the term of this patent is extended or adjusted under 35 U.S.C. 154(b) by 0 days.

(21) Appl. No.: 09/242,610

(22) PCT Filed: Aug. 20, 1997

(86) PCT No.: PCT/EP97/04529

§ 371 Date: Nov. 12, 1999

§ 102(e) Date: Nov. 12, 1999

(87) PCT Pub. No.: WO98/07587

PCT Pub. Date: Feb. 26, 1998

(30) Foreign Application Priority Data

Aug. 20, 1996 (DE) .......................................... 296 14 444 U

(51) Int. Cl.[7] .................................................... F16B 9/02

(52) U.S. Cl. ........................ 403/348; 403/322.4; 285/87; 285/401

(58) Field of Search ................................. 403/348, 349, 403/350, 326, 330, 315, 317, 322.4; 285/81, 87, 360, 376, 401, 39; 137/614.04

(56) References Cited

U.S. PATENT DOCUMENTS

| | | | | |
|---|---|---|---|---|
| 255,523 | * | 3/1882 | Lightburne, Jr. ................. | 285/360 X |
| 729,129 | * | 5/1903 | Catterall ............................ | 285/360 X |
| 809,746 | * | 1/1906 | Rhoads .............................. | 285/360 X |
| 815,627 | * | 3/1906 | Oldham ............................. | 285/376 X |
| 1,238,928 | * | 9/1917 | Martz ................................ | 285/376 X |
| 1,613,644 | * | 1/1927 | Costello ............................. | 285/87 X |
| 1,945,760 | * | 2/1934 | Strouf ................................ | 285/376 X |
| 2,283,974 | * | 5/1942 | Dillon ............................... | 285/360 X |
| 2,400,351 | * | 5/1946 | Hart .................................. | 285/376 X |
| 2,690,542 | * | 9/1954 | Pearce et al. ..................... | 403/350 X |
| 2,933,711 | * | 4/1960 | Eaton ................................ | 403/349 X |
| 4,400,856 | * | 8/1983 | Tseng ................................ | 403/348 X |
| 4,429,938 | * | 2/1984 | Flor ................................... | 403/349 X |
| 4,449,737 | * | 5/1984 | Specht ............................... | 285/87 X |
| 4,643,459 | * | 2/1987 | Carson .............................. | 285/360 X |
| 4,990,022 | * | 2/1991 | Watanabe et al. ................ | 403/349 X |
| 5,301,985 | * | 4/1994 | Terzini .............................. | 285/376 X |
| 5,549,228 | * | 8/1996 | Brown .............................. | 285/401 X |
| 5,626,435 | * | 5/1997 | Wohlhuter ........................ | 403/348 |
| 5,762,437 | * | 6/1998 | Neilson et al. ................... | 403/348 X |
| 5,857,713 | * | 1/1999 | Horimoto ......................... | 285/81 |
| 5,960,819 | * | 10/1999 | Weissinger et al. .............. | 403/349 X |

* cited by examiner

Primary Examiner—Lynne H. Browne
Assistant Examiner—David E. Bochna
(74) Attorney, Agent, or Firm—Michael Best & Friedrich LLP

(57) ABSTRACT

A coupling including a first coupling element having interlocking claws extending outwardly in radial direction and additional interlocking claws outwardly offset from the interlocking claws in radial direction and including a second coupling element having claws outwardly offset from the locking claws in radial direction. The interlocking claws grip behind the locking claws like a bayonet catch and the additional interlocking claws grip behind the additional locking claws like a bayonet catch while the second coupling element is rotated relative to the first coupling element. The advantage of this coupling is to absorb tensile and pressure forces as well as bending moments.

18 Claims, 7 Drawing Sheets

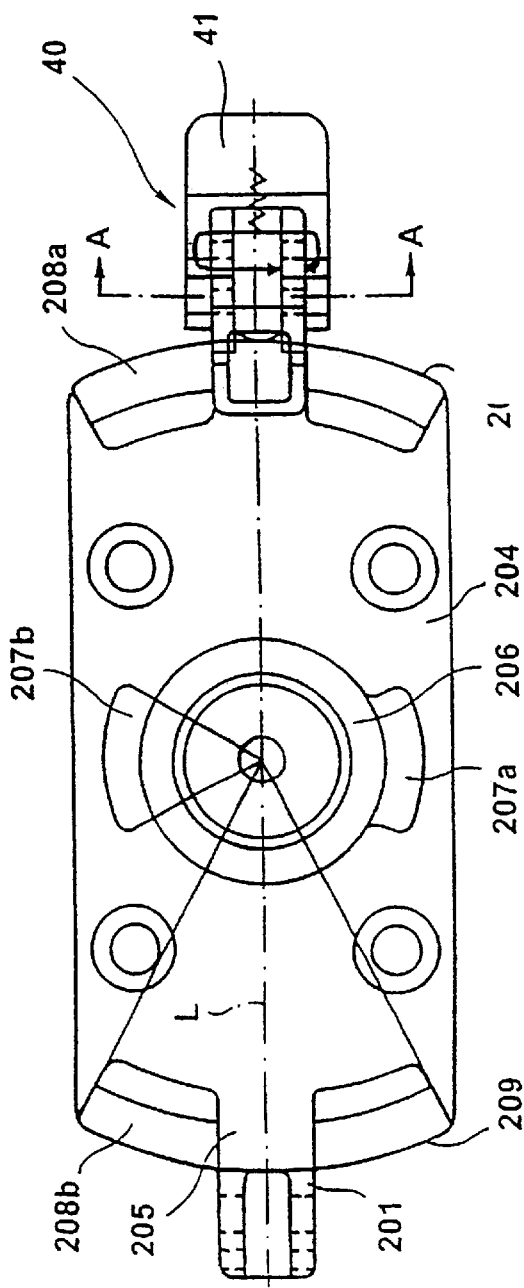
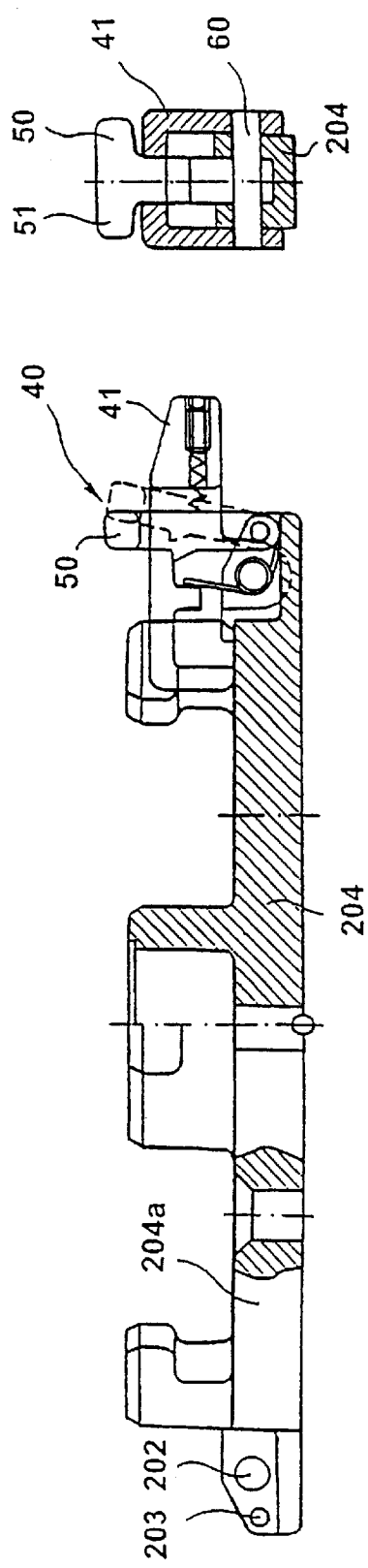
FIG.4
FIG.5
FIG.6

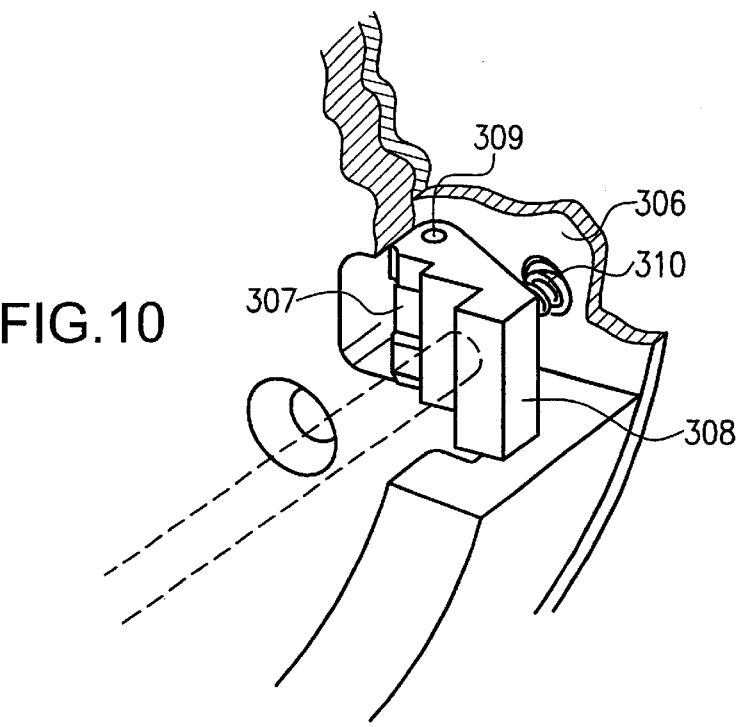
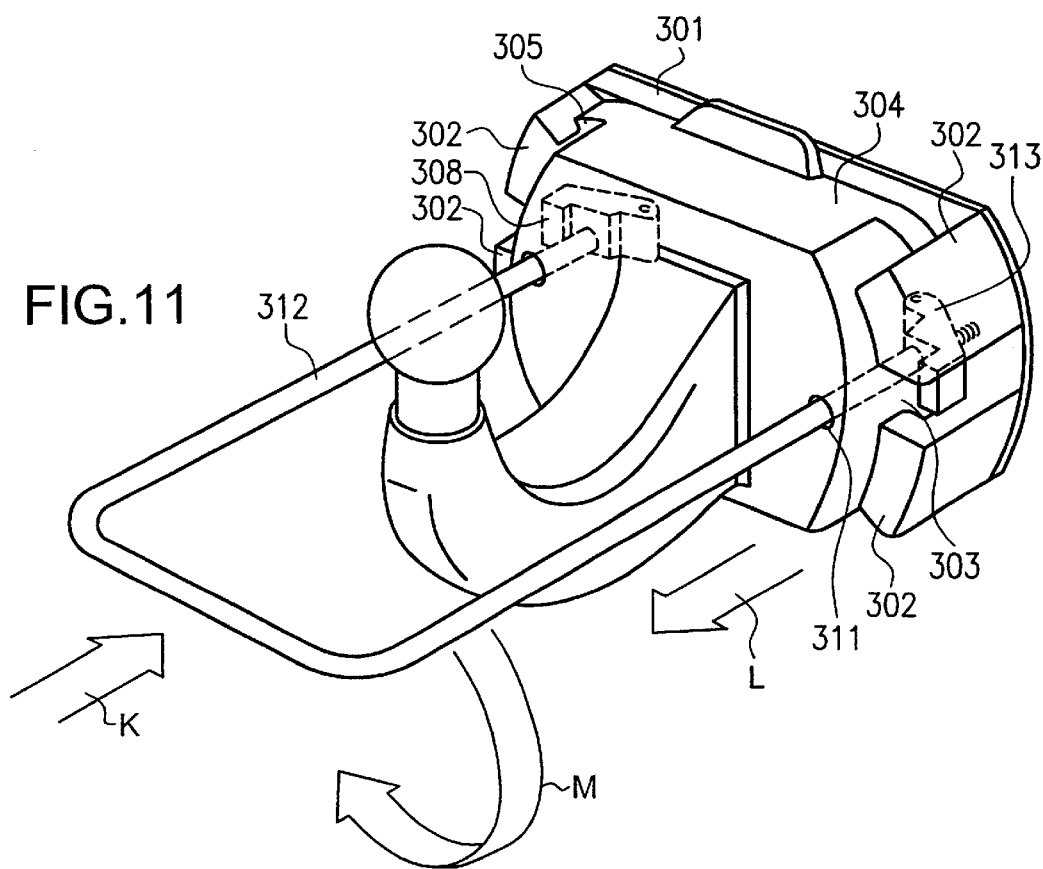

COUPLING DEVICE FOR A VEHICLE

The invention relates to a coupling means according to the preamble of claim 1.

Figure 3:
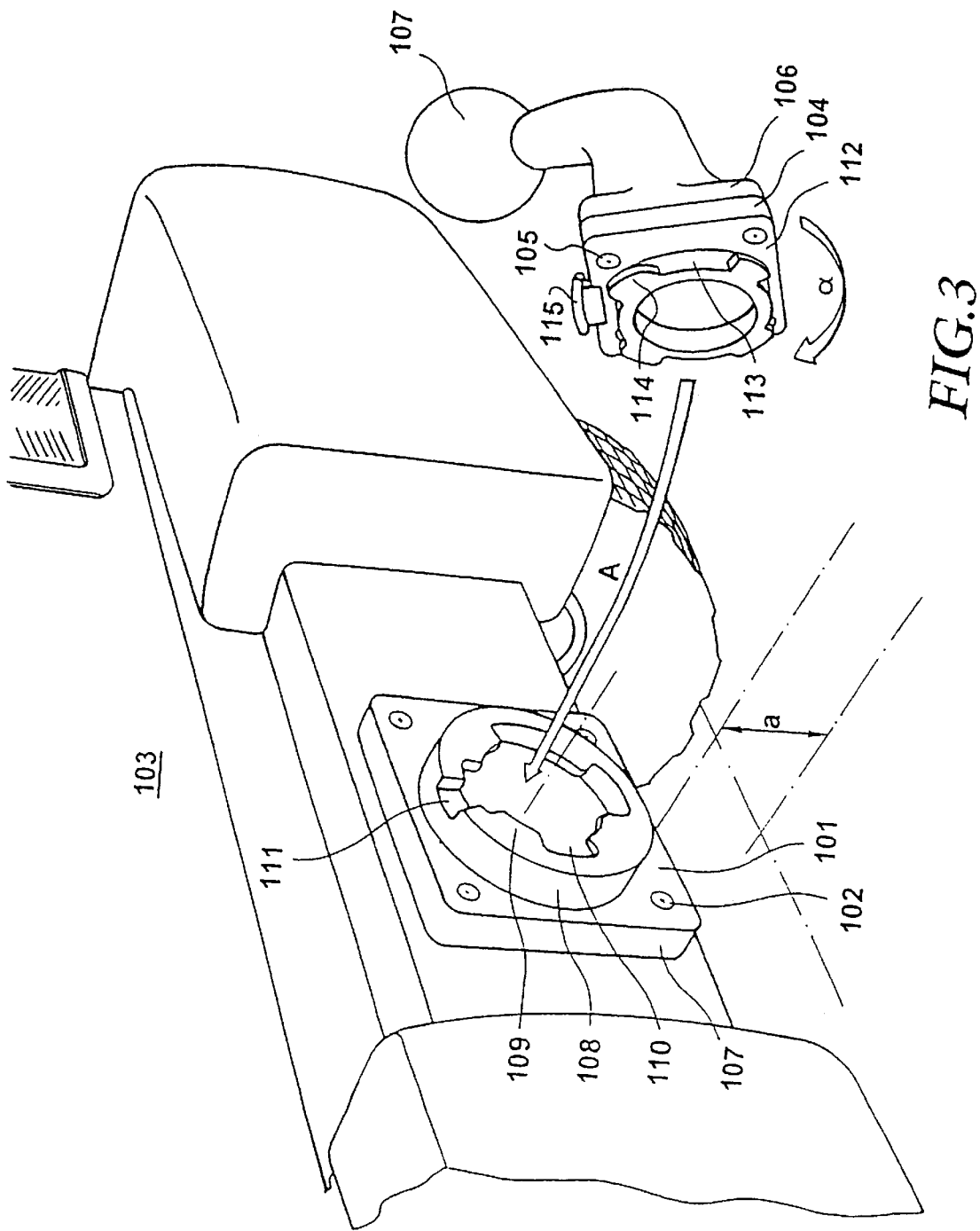

Such a generally known coupling means, which has the form of a bayonet catch, is described in more detail by means of FIG. 3.

A stationary coupling element 101 is fastened to the rear side of the vehicle by means of screws 102. A detachable coupling element 104 being provided for connection with the stationary coupling element 101 is connected by means of screws 105 with a trailer coupling 106, which carries a ball head 107.

The stationary coupling element 101 comprises a base plate 107, with which an outer ring 108 is firmly connected at an axial side. Locking claws 109 are disposed on the outer ring 108 spaced apart from the base plate 107 and in the direction radial to the center line. Recesses 110 are provided between the locking claws 109. Moreover, a recess 111 is provided in an axial area on the outer ring 108. The detachable coupling element 104 comprises a base plate 112 and an inner ring 113 firmly connected therewith. The outer diameter of the inner ring 113 is adjusted to the inner diameter of the outer ring 108 such that the inner ring 113 guides the outer ring 108. The inner ring 113 comprises interlocking claws 114 spaced apart from the base plate 112 and radially facing away from the center line, which correspond in their number (four claws are provided in the present embodiment) to the number of the locking claws 109 on the outer ring 108. The width of the recesses 110 is dimensioned such that the claws 114 can be inserted therein. A spring biased lock 115 is disposed on the base plate 112 of the detachable coupling element 104 securing the detachable coupling element 104 against radial rotation over the stationary coupling element 101.

The assembly of said coupling means is hereinafter described. At first, the detachable coupling element 104 is rotated by an angle $\alpha$. Through movement in the direction of the arrow A, the detachable coupling element 104 is brought to the stationary coupling element 101, wherein the locking claws 114 enter into the recesses 110 of the outer ring 108. By reversing the detachable coupling element 104 by the angle $\alpha$, the interlocking claws 114 of the inner ring 113 grip behind the locking claws 19 of the outer ring 108 like a bayonet catch, and the lock 115 catches the recess 111, wherein the detachable coupling element 104 is secured against rotation.

This coupling means, which is attached to the rear of the vehicle, particularly serves to absorb tensile forces and to a small extent also bending moments. Said coupling means is not suited to be used for front attachments, such as snow plows, ground borers, sweeping machines and rams, which are mainly attached in the front area of the vehicle, due to the high bending moments occurring with said front attachments.

Also, the coupling cannot optionally be enlarged in its outer dimensions, as predetermined parameters, e.g. dimension a for ground clearance, do not allow this.

It is the object of the invention to provide a coupling means easy to assemble, which absorbs high bending moments.

Said object is provided with the features according to the characterizing part of claim 1.

According to the invention, at least two additional interlocking claws extending inwardly in a radial direction are additionally disposed on one of the coupling elements, which additional interlocking claws are offset from the interlocking claws in radial direction, and correspondingly thereto at least two additional locking claws extending outwardly in radial direction are additionally disposed on the other of the coupling elements, which additional locking claws are outwardly offset from the locking claws in radial direction. Said arrangement allows the engaged claws, in particular the radially external ones, to absorb high bending moments whereas the radially internal claws can absorb particularly high tensile and pressure forces.

Further embodiments of the invention are described in the subclaims.

The invention is explained in more detail by means of the drawings, wherein

Figure 1:
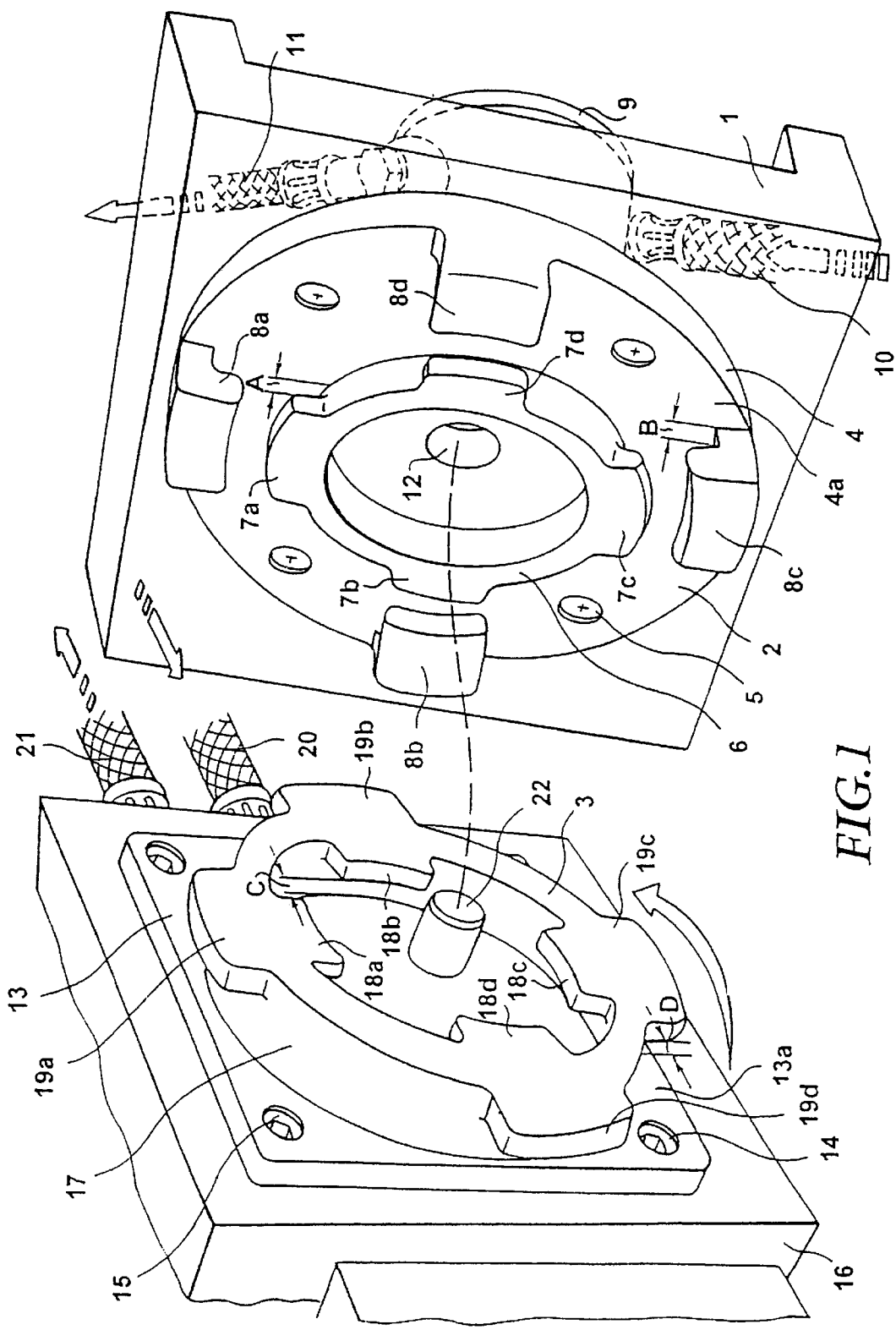
Figure 2:
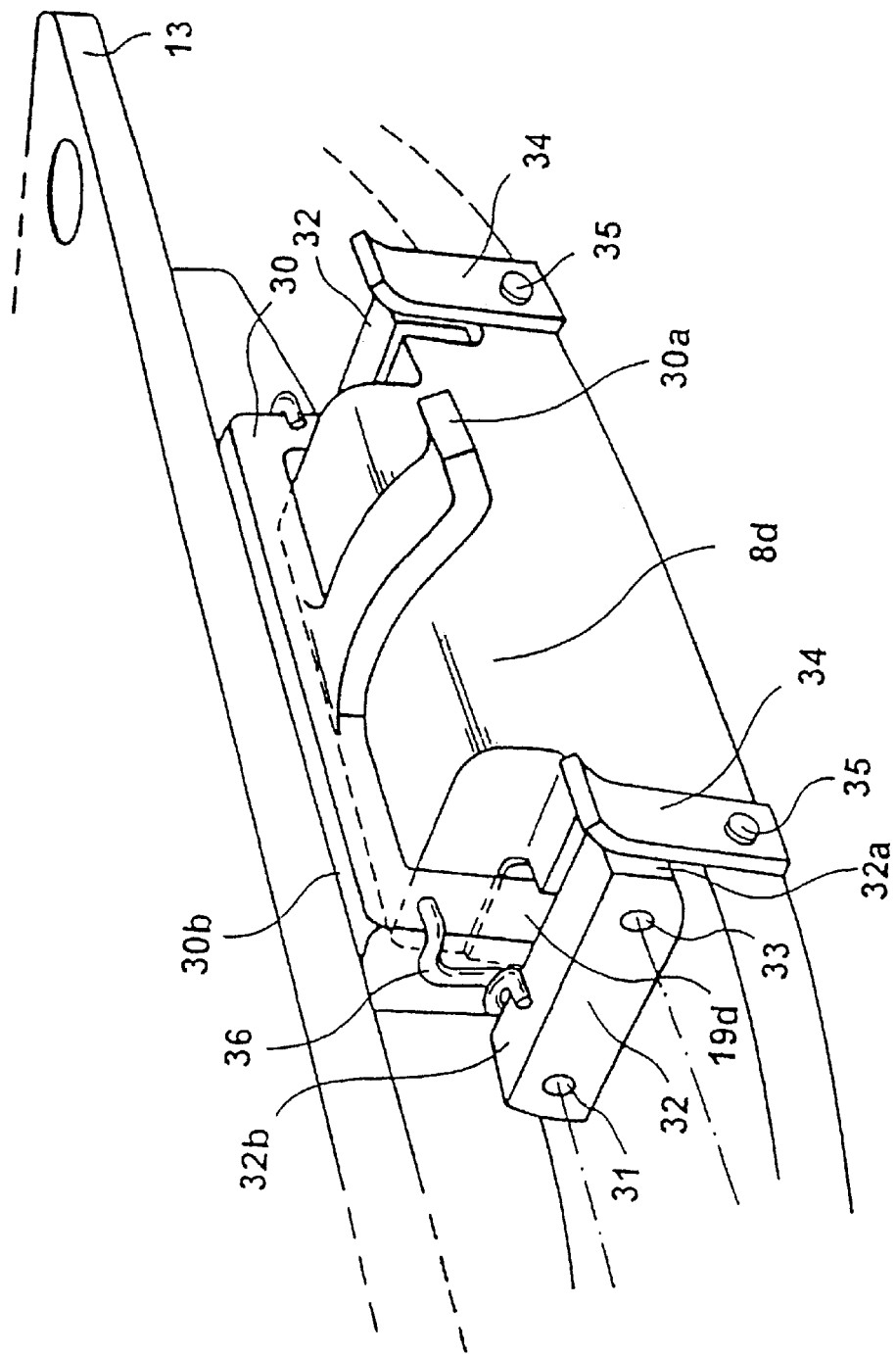
Figure 7:
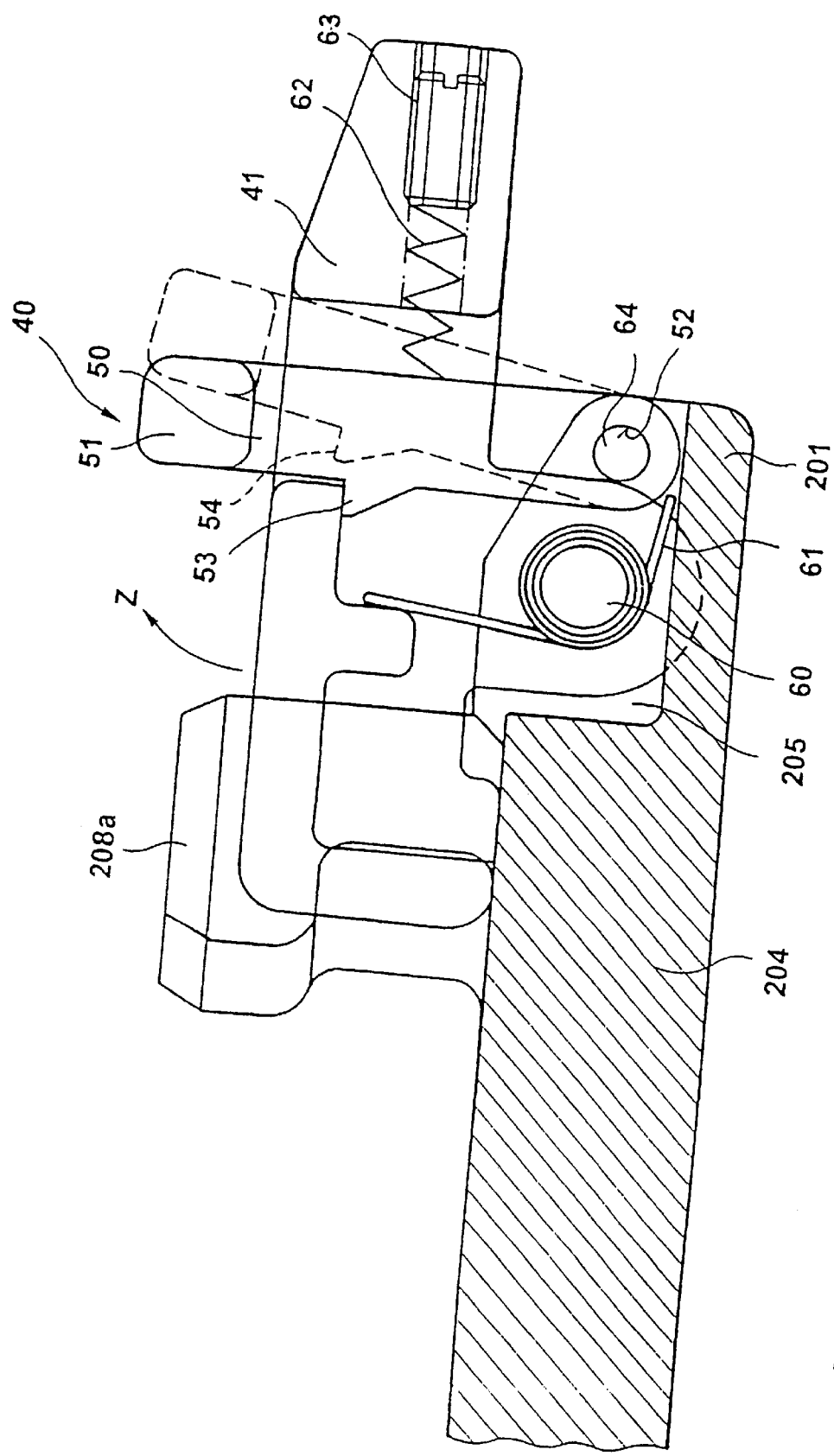
Figure 8:
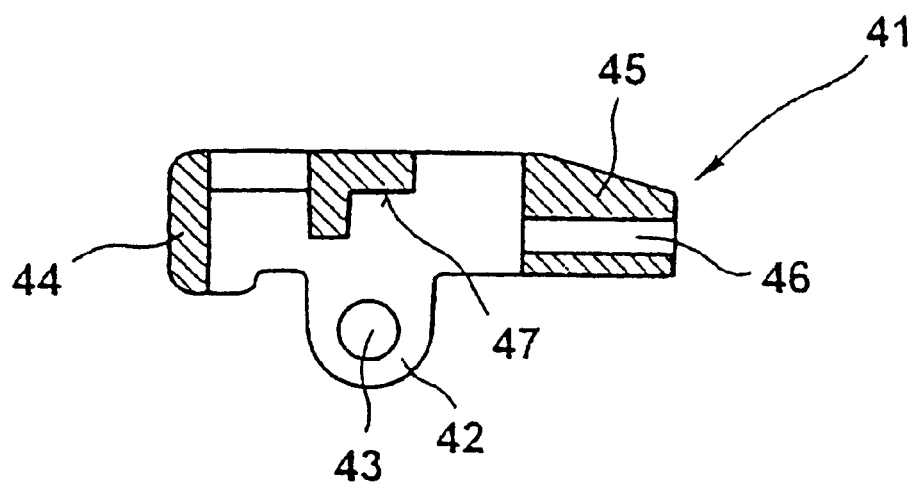
Figure 9:
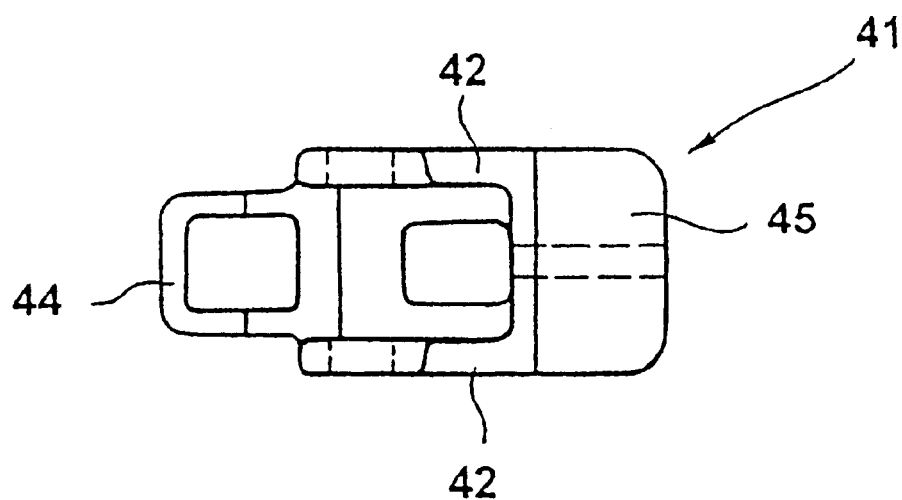

FIG. 1 shows a perspective view of the coupling means according to the invention, wherein both coupling elements are positioned separate from each other, FIG. 2 shows both coupling elements in a locked position, FIG. 3 shows a perspective view of a conventional coupling means, wherein both coupling elements are positioned separate from each other, FIG. 4 shows a top view on a base plate comprising a locking means according to a further embodiment of the invention, FIG. 5 shows a lateral view of FIG. 4 in semi-section, FIG. 6 shows a sectional view of the locking means extending along line A—A of FIG. 4, FIG. 7 shows an enlarged lateral view of the locking means, FIG. 8 shows a sectional view of a swivel bow of the locking means, FIG. 9 shows a top view on the swivel bow of FIG. 8, FIG. 10 shows a detailed view of a further locking means, and FIG. 11 shows a perspective view of a coupling means comprising a locking means according to FIG. 10.

As is illustrated in FIG. 1, a front traverse 1 of the vehicle carries a stationary coupling element 2, which can be engaged with a detachable coupling element 3.

The stationary coupling element 2 comprises a base plate 4, which is fastened to the front traverse 1 by means of screws 5. An inner ring 6 is connected with the base plate 4 and is provided with interlocking claws 7 extending outwardly in a radial direction (four interlocking claws 7a, 7b, 7c, 7d in this embodiment), which are formed at identical distances over the outer circumferential surface of the inner ring 6. The base plate 4, which is round in this embodiment, however, which can also be of a different configuration, is provided with four additional interlocking claws 8 extending inwardly in a radial direction (four additional interlocking claws 8a, 8b, 8c, 8d in this embodiment), which are spaced apart from interlocking claws 7 in radial direction and which are positioned opposite said interlocking claws 7.

In this embodiment, the inner ring 6 is attached to the base plate 4 or integrally formed with the base plate 4.

The interlocking claws 7 have a predetermined thickness and form a space A between their axial inner surfaces and an outer surface 4a of the base plate 4, wherein the space A is configured to form a ring sector.

The additional interlocking claws 8 equally have a predetermined thickness and form a space B between their axial inner surfaces and the outer surface 4a of the base plate 4, wherein said space B is equally configured to form a ring sector.

On the rear side of the base plate 4 a valve 9 is centrically attached, to which a supply pipe 10 and a discharge pipe 11 are connected. Said supply pipes 10 and discharge pipes 11 serve the transport of a working medium, such as hydraulic fluid or compressed air.

A through bore 12 is provided centrically to the inner ring 6, which penetrates the base plate 4. In an area facing the outer surface 4a, the through bore 12 is tapered and funnel-shaped.

A valve piston (not illustrated) of the valve 9 is positioned opposite an end of the through bore 12, which end is opposite the conical area, or projects into the same. The valve piston is spring biased in the direction of the conical area, wherein the valve piston is held in a final position by means of a limit stop (not illustrated). In said final position the valve piston completely stops the flow through the valve 9. This makes sure that a working medium can only flow through the valve 9, when the detachable coupling element 3 is coupled with stationary coupling element 2.

According to another embodiment, an electric or electronic switch, the operating pin of which projects into the through bore 12, or a linear potentiometer, the voltage tap of which is configured to form an operating pin projecting into the through bore 12, is provided instead of the valve 9. The pipes 9, 10, 20, 21 for liquid or gaseous media are replaced by electrical lines in this embodiments.

The detachable coupling element 3 comprises an instrument plate 13, in which bores 14 are configured to accommodate screws 15, preferably hexagon socket screws, connecting the instrument plate 13 with an additional device 16. The additional device 16 is preferably provided for attachment at the front side of the vehicle, and is, for instance, a snow plow, a ground borer, a sweeping machine, a ram, a ball head coupling or an open jawed coupling. If required, the stationary coupling element 2 can also be provided at the rear side of the vehicle for being coupled with corresponding additional devices 16.

An outer ring 17 is attached to the instrument plate 13 or is integrally formed therewith, and is provided with locking claws 18 (four locking claws 18a, 18b, 18c, 18d in this embodiment) extending inwardly in radial direction, which are formed at regular distances over the inner circumferential surface of the outer ring 17. Four additional locking claws 19 (four additional locking claws 19a, 19b, 19c, 19d in this embodiment) extending outwardly in radial direction are provided over the outer circumferential surface of the outer ring 17, which are configured opposite to the locking claws 18 in radial direction.

In an alternative embodiment the outer ring 17 can be rotatably connected with the instrument plate 13. Flattenings or other suited tool engagement surfaces are provided over the outer circumference of the outer ring 17, for allowing a tool, e.g. an open yawed wrench, to be put on for rotating the outer ring 17.

The locking claws 18 have a predetermined thickness and form a space C between their axial inner surfaces and an inner surface 13a of the instrument plate 13, wherein the space C forms a ring sector.

The additional locking claws 19 equally have a predetermined thickness and form a space D between their axial inner surfaces and the inner surface 13a of the instrument plate 13, wherein said space D equally forms a ring sector.

In a preferred embodiment the interlocking claws 7, the additional interlocking claws 8, the locking claws 18 and the additional locking claws 19 have the same thickness, which essentially corresponds to the spaces A, B, C and D.

In an alternative, not illustrated embodiment one of the interlocking claws 7, one of the locking claws 18, one of the additional interlocking claws 8 or one of the additional locking claws 19 is configured thicker than the other corresponding claws, and one of the corresponding locking claws 18, the interlocking claws 7, the additional locking claws 19 or the locking claws 18 is configured to be thinner than the other claws, thus obtaining in a facilitated manner that the additional device 16 can be coupled with the vehicle only in a predetermined position.

In the above-described embodiments the thickness of the claws 7; 8; 18; 19 and the spaces A, B, C, D are so coordinated that the outer surfaces of the interlocking claws 7 and the additional interlocking claws 8 contact the inner surface 13a of the instrument plate 13, and that the outer surfaces of the locking claws 18 and the additional locking claws 19 contact the outer surface 4a of the base plate 4. Thus, high forces and moments can be transmitted from the detachable coupling element 3 to the stationary coupling element 2 on one hand, and undesired vibrations between the detachable coupling element 3 and the stationary coupling element 2 in connection with an emission of noise can be avoided on the other.

In another embodiment the interlocking claws 7 and correspondingly thereto locking claws 18 corresponding thereto, as well as the additional interlocking claws 8 and correspondingly thereto the additional locking claws 19 have a steadily increasing thickness, in order to press in the nature of a screwed connection the outer surfaces of the interlocking claws 7 and the additional interlocking claws 8 against the inner surface 13a of the instrument plate 13, and the outer surfaces of the locking claws 18 and the additional locking claws 19 against the outer surface 4a of the base plate, when the detachable coupling element 3 is rotated against the stationary coupling element 2. By tensioning the outer surfaces of the claws against the inner surfaces 13a of the instrument plate 13 or the outer surface 4a of the base plate 4, respectively, a particularly safe transmission of forces or moments from the detachable coupling element 3 to the stationary coupling element 2 is made possible.

The inner diameter of the outer ring 17 is coordinated with the outer diameter of the inner ring 6 such that the inner ring 6 guides the outer ring 17 when axially joining the detachable coupling element 2 and the stationary coupling element 3.

The additional device 16 comprises a supply pipe 20 and a discharge pipe 21. A control pin 22 is arranged centrically to the outer ring 17, the length of which depends on the nature of the additional device 16, which is hereinafter explained in more detail.

The assembly of the detachable coupling element 3 and the stationary coupling element 2 is explained in the following. The detachable coupling element 3 is rotated by an angular sum such that the locking claws 18 enter into clearances between the interlocking claws 7 and that the additional locking claws 18 enter into clearances between the additional interlocking claws 8. The conical shape of the through bore 12 allows a first guide in axial direction by means of the control pin 22, which control pin 22 is pushed into through bore 12. When further approaching the detachable coupling element 3 to the stationary coupling element 2 in axial direction, the inner diameter of the outer ring 17 is guided through the outer diameter of the inner ring 6.

In a completely joined axial position the detachable coupling element 3 can be reversed by the angular sum, wherein the interlocking claws 7 and the locking claws 18 as well as the additional interlocking claws 8 and the additional locking claws 19 mutually grip behind each other like a bayonet catch.

The radial internal connection of the interlocking claws 7 and the locking claws 18 absorbs particularly tensile and pressure forces, and the radial external connection of the additional interlocking claws 8 and the additional locking claws 19 absorbs particularly the horizontal and vertical bending moments.

The control pin 22 with its predetermined length in response to the nature of the additional device 16 is pressed against the valve piston of valve 9. The length of the control pin 22 controls the quantity of the working medium flowing through the valve 9. The supply pipe 10 is connected with a pump (not illustrated) disposed at the vehicle. The discharge pipe 11 is connected with a supply pipe 20 at the additional device 16. The discharge pipe 21 allows the working medium to return into the cycle system.

In another embodiment, where the valve is replaced by a switch or a potentiometer, the control pin 22 is pressed against the operating pin with its predetermined length depending on the nature of the additional device 16, wherein the switch is switched on or off or wherein in case of the potentiometer the operating pin of the potentiometer is correspondingly displaced in response to the length of the control pin 22, such that for different front devices, for instance, different voltages are supplied to the additional device via the electrical lines.

In a further embodiment an electronic control means for controlling the additional device 16 is provided on the first coupling element 2, which allows an electric, hydraulic or pneumatic control of the additional device. Power data corresponding to the additional devices are stored on a respective chip being provided on the respective control pin 22 of the additional device 16. The electronic control means comprises a scanning device scanning the corresponding characteristic data from the chip and analogously allowing control of the additional device 16.

FIG. 2 illustrates an interlocking means securing the detachable coupling element 3 against rotation to the stationary coupling element 2 in radial direction.

A U-shaped interlocking bow 30 is pivotably connected with interlocking levers 32 at lateral surfaces of its legs over axes 31. The interlocking levers 32 again are pivotably connected with lateral surfaces of the additional interlocking claw 8d over axes 33. Two plate springs 34 are fastened to the outer circumference of the base plate 4 by means of screws 35 such that the plate springs 34 each press against a front surface 32a of the interlocking lever 32. A torsion spring 36 is each mounted on the axes 31, from which a leg presses against the interlocking lever 32 and another leg presses against the interlocking bow 30. For the better handling the interlocking bow 30 has a handle 30a. The width between the legs of the interlocking bow 30 corresponds to the width of the additional interlocking claw 8d or the additional locking claw 19d, respectively.

The functioning of the interlocking means is hereinafter described. When the additional interlocking claws 8 and the additional locking claws 19 mutually grip behind each other and are aligned in radial direction, the interlocking bow 30 is lifted by means of the handle 30a over the additional interlocking claw 8d gripping behind the additional locking claw 19d. Thus, the interlocking levers 32 are brought into the locked position against the force of the plate springs 34 and are kept in this position through the plate springs 34. The torsion springs 36 press the interlocking bow 30 in the direction of the instrument plate 13, wherein a lower surface of the base part 30b of the interlocking bow 30 opposes the inner surface 13a of the instrument plate 13 in said locked position. In a preferred arrangement of this embodiment the thickness of the additional interlocking claw 8d is so dimensioned that a space is formed between the outer surface of the additional interlocking claw 8d and the inner surface 13a of the instrument plate 13. The base part 30b of the interlocking bow 30 is so dimensioned that it fills the space between the additional interlocking claw 8d and the instrument plate 13 thereby effecting the interlocking bow 30 to be tensioned with the instrument plate 13.

For unlocking the handle 30a is pressed down, wherein the interlocking bow 30 is at first pivoted against the spring resistance of the torsion springs 36 around the axes 31, releasing the additional interlocking claw 8d and the additional locking claw 19d. When further pressing the handle 30a, the interlocking levers 32 are pivoted against the spring resistance of the plate springs 34 around the axes 33 until the plate springs 34 contact lateral surfaces 32b of the interlocking levers 32. In this way the interlocking lever 30 has a secure position in the unlocked position.

The invention is not restricted to the described embodiments. Thus, two claws can be disposed at an angle of 180° (cf., for instance, FIG. 4) instead of the four claws. Another embodiment features three claws each offset by 120°. In a further embodiment more than four claws are used. It also possible that the interlocking claws/locking claws are different in number from the number of the additional interlocking/additional locking claws.

In a further embodiment the claws can be displaced on the base plate 4 or the instrument plate 13, respectively, which are pre-stressed in axial direction by means of springs, for instance disk springs, in order to press the outer surfaces of the claws against the outer surface 4a of the base plate 4 or the inner surface 13a of the instrument plate 13, respectively.

In a further embodiment further additional interlocking claws and further additional locking claws are disposed outwardly from the additional interlocking claws 8 or the additional locking claws 19 in radial direction.

Another embodiment of the locking means is illustrated in FIGS. 4 to 9. A base plate 204, which in this embodiment is an elongated one, comprises a centric inner ring 206, at which two interlocking claws 207a, 207b are disposed offset by 180°. Small sides 209 of the base plate 204 are each configured in the form of a circular arc section and form the edge of two additional interlocking claws 208a, 208b.

Like in the first embodiment the interlocking claws 207 and the additional interlocking claws 208 have a predetermined thickness and form a space between their axial inner surfaces and an outer surface 204a of the base plate, which is configured to form a ring sector.

Extending outwardly from the small sides 209 of the base plate 204, shoulders 201 are each formed centrically to a longitudinal axis L. The shoulders 201 each have a first bore 202 and a second bore 203, which extend to the longitudinal axis L at right angles.

Centrically to the longitudinal axis L the additional interlocking claws 208 have a slot 205, the depth of which extends to the outer surface 204a.

For the sake of simplification, the instrument plate corresponding to the base plate 204 is not illustrated in this embodiment, wherein it has to be noted that the shape of the instrument plate essentially corresponds to the shape of the base plate 204.

The locking means in this embodiment is generally designated by 40 and is illustrated in FIG. 7 in an enlarged scale.

The locking means 40 comprises a pivotable bow 41, which is illustrated in FIGS. 8 and 9 in more detail. The pivotable bow 41 has two side walls 42 in each of which a radial bore 43 is formed. The pivotable bow 41 comprises a locking area 44 and an operating area 45. A bore 46 for accommodating a spring is formed in the operating area 45. In a center area the pivotable bow 41 has a blocking surface 47 the function of which is hereinafter explained.

Moreover, the locking means 40 comprises a stopping lever 50, the structure of which can be inferred from FIGS. 6 and 7. The stopping lever 50 comprises a handle area 51 and a pin bore 52. In a center area essentially in vertical direction a retention nose 53 having a retention surface 54 is provided.

The pivotable bow 41 is fastened to the shoulder 201 of the base plate 204 by means of a pivotable pin 60, wherein the pivotable pin 60 (FIG. 6) is passed through the radial bore 43 (FIG. 8) of the pivotable bow 41 and the first bore 202 on the shoulder 201. The pivotable bow is dimensioned such that the width of the locking area 44 is adjusted to the width of the slot 205. A torsion spring 61 is arranged around the privotable pin 60, wherein a leg of the torsion spring 61 is supported by the base plate 204 and the other leg of the torsion spring 61 is supported by the pivotable bow 41. A pressure spring 62 is disposed in a bore 46 for accommodating a spring, the spring resistance of which can be adjusted by means of an adjusting screw 63. The bore 46 for accommodating a spring comprises in its rear area an internal screw thread for screwing in the adjusting screw 63.

The stopping lever 50 is connected with the base plate 204 by means of a pin 64, wherein the pin 64 is passed through the pin bore 52 of the stopping lever 50 and the second bore 203 of the shoulder 201 of the base plate 204. Thus, the pivotable bow 41 and the stopping lever 50 are each pivotably connected with the base plate 204 by themselves.

In the following the functioning of the locking means subject to this embodiment is described. An instrument plate (not illustrated), the additional locking claws of which are equally provided with a slot corresponding to the slot 205 of the base plate 204, is engaged with the base plate 204 in the same manner as described in the first embodiment, wherein the pivotable bow 41 is pivoted upwardly in the direction of an arrow Z against the resistance of a torsion spring 61.

When the slot on the additional locking claws of the instrument plate and the slot 205 of the base plate 204 are in alignment, the pivotable bow 41 is released, wherein said pivotable bow 41 moves into the slot 205 through the spring resistance of the torsion spring 61 and stops at the outer surface 204a of the base plate 204. Thus the engaged additional locking claw of the instrument plate and the additional interlocking claw 208a of the base plate 204 are blocked.

In order to avoid an automatic unlocking, the stopping lever 50, which is pre-stressed by the resistance of the pressure spring 62 in the direction of the locking area 44 of the pivotable bow 41, is in the position illustrated in FIG. 7 as full line. Said position is adopted, if the pivotable bow 41 sits on the base plate 204 with its locking area 44. The blocking surface 47 of the pivotable bow 41 lies on top of the retention surface 54 of the retention nose 53, wherein a movement of the pivotable bow 41 in the direction of arrow Z is safely prevented.

For releasing the locking means 40, the stopping lever 50 is at first pivoted into the position indicated by a dotted line in FIG. 7, against the resistance of the pressure spring 62, so that the retention surface 54 of the retention nose 53 of the stopping lever 50 is brought into disengagement with the retention surface 47 of the pivotable bow 41. Thus, the pivotable bow 41 can be pivoted against the resistance of the torsion spring 61 in the direction indicated by arrow Z allowing the pivotable bow 41 to become disengaged from slot 205 of the additional interlocking claw 208a and the corresponding slot of the additional locking claw, so that the instrument plate can be released from the base plate 204. Modifications of this embodiment are possible. Thus, a pin can be disposed between the pressure spring 62 and the stopping lever 50, which is guided in the bore for accommodating a spring.

It is to be noted that also mixed forms between the individual embodiments are possible.

A further embodiment of a locking means is illustrated in FIGS. 10 and 11.

As can be seen in FIG. 11, a stationary coupling element 301 comprises two pairs of interlocking claws 302, wherein each pair of interlocking claws 302 is spaced apart from each other by means of a groove 303. Two pairs of locking claws 305 are disposed on a detachable coupling element 304, which claws are spaced apart from each other by means of a groove 313 and which grip behind the interlocking claws 302 like a bayonet catch.

Two holding means 307 are disposed on a support plate 306 of the stationary coupling element 301, each of which carries a locking means 308 engaging with grooves 303 and 313.

As is shown in FIG. 10, the locking means 308 is connected with the holding means 307 via a rotational axis 309 allowing a rotating movement towards the support plate 306 (in the direction of arrow K) and away therefrom (in the direction of arrow L). A pressure spring 310 pre-stresses the locking element 308 in the direction of arrow L.

Instead of the pressure spring 310, also a torsion spring (not illustrated) can be used for pre-stressing the locking element 308.

The detachable coupling element 304 comprises two bores 311, into which a U-shaped bow 312 can be inserted. The bores 211 are so arranged that the ends of the bow 312 engage with the locking elements 308.

The functioning of the locking means according to FIGS. 10 and 11 is hereinafter explained in more detail. When joining the detachable coupling element 304, the locking elements 308 are moved against the resistance of the springs 310 in the direction of arrow K, wherein the path for the rotational movement is cleared in the sense of rotation. In a locked position, in which both grooves 303, 313 are in alignment, the locking elements 308 are pivoted into the grooves 303 and 313 through the resistance of the pressure springs 310. This allows the detachable coupling element 304 to be locked with the stationary coupling element 301 in a positive manner.

For unlocking, the ends of the bow 312 are inserted into bores 311. The ends of the bow 312 press the locking elements 308 in the direction of arrow K allowing a rotational movement of the detachable coupling element 304 in the direction of arrow M.

Modifications of this embodiment are possible. Thus, the locking elements 308 can also be connected with the detachable coupling element 304.

The described embodiment of the locking means according to FIGS. 10 and 11 can also be applied in the other embodiments of the coupling means described.

What is claimed is:

1. A coupling assembly adapted to connect an additional device to a vehicle, said coupling assembly comprising:
   a first coupling element, on which at least two interlocking claws are disposed extending outwardly in radial direction, and
   a second coupling element, on which at least two locking claws are disposed extending inwardly in radial direction, wherein the interlocking claws and the locking claws are so arranged and dimensioned that the interlocking claws grip behind the locking claws like a bayonet catch, when the second coupling element is rotated relative to the first coupling element, wherein at least two additional interlocking claws are additionally disposed on the first coupling element, which are outwardly offset from the interlocking claws in radial direction, and wherein at least two additional locking claws are additionally disposed on the second coupling element, which are outwardly offset from the locking claws in radial direction, wherein the additional interlocking claws and the additional locking claws are so arranged and dimensioned that the additional interlocking claws grip behind the additional locking claws like a bayonet catch, when the second coupling element is rotated relative to the first coupling element, in particular for absorbing lateral powers, wherein the first coupling element includes a base plate adapted to be attached to the vehicle and the second coupling element includes an instrument plate adapted to be attached to the additional device, wherein the base plate includes a through bore arranged centrically to the inner ring, which through bore opens conically in the direction of the outer surface of the base plate, wherein a valve is arranged on a surface of the base plate opposite the outer surface, the valve including a spring biased valve piston which extends in the direction of the through bore, wherein the valve piston controls the flow rate of a working medium being supplied to the additional device, and wherein a control pin is fastened to the instrument plate centrically to the outer ring, which enters into the through bore and displaces the spring biased valve piston in axial direction for adjusting a specified flow rate of the working medium.

2. A coupling according to claim 1, wherein four interlocking claws are arranged offset at an angle of 90° and four additional interlocking claws are arranged offset at an angle of 90°, wherein the interlocking claws and the additional interlocking claws are aligned in transverse direction.

3. A coupling according to claim 1, wherein four locking claws are arranged offset at an angle of 90° and four additional locking claws are arranged offset at an angle of 90°, wherein the locking claws and the additional locking claws are aligned in transverse direction.

4. A coupling according to claim 1, wherein the interlocking claws, the additional interlocking claws, the locking claws and the additional locking claws have the same thickness.

5. A coupling according to claim 1, wherein further additional interlocking claws are arranged offset to the additional interlocking claws in radial direction and correspondingly thereto further additional locking claws are arranged offset to the additional locking claws in radial direction.

6. A coupling according to claim 1, wherein the first coupling element includes an inner ring which is connected with the base plate.

7. A coupling according to claim 6, wherein the interlocking claws are arranged at the outer circumference of the inner ring and the additional interlocking claws are arranged in a radial outer area of an outer surface of the base plate.

8. A coupling according to claim 6, wherein the second coupling means includes an instrument plate adapted to be connected with the additional device and an outer ring being connected with the instrument plate.

9. A coupling according to claim 8, wherein the locking claws are arranged at the inner circumference of the outer ring and the additional locking claws are arranged at the outer circumference of the outer ring.

10. A coupling according to claim 7, wherein the outer diameter of the inner ring is adjusted to the inner diameter of outer ring such that the outer ring is guided by the inner ring in axial direction.

11. A coupling according to claim 8, wherein the thickness of the interlocking claws, the locking claws, the additional interlocking claws and the additional locking claws are dimensioned such that in the coupled state outer surfaces of the interlocking claws and the additional interlocking claws contact the inner surface of the instrument plate and outer surfaces of the locking claws and the additional locking claws contact the outer surface of the base plate.

12. A coupling according to claim 8, wherein the interlocking claws and correspondingly thereto the locking claws as well as the additional interlocking claws and correspondingly thereto the additional locking claws have a steadily increasing thickness, in order to press in the nature of a screwed connection the outer surfaces of the interlocking claws and the additional interlocking claws against the inner surface of the instrument plate, and the outer surfaces of the locking claws and the additional locking claws against the outer surface of the base plate, when the second coupling element is rotated against the first coupling element.

13. A coupling assembly adapted to connect an additional device to a vehicle, said coupling assembly comprising:

a first coupling element on which at least two interlocking claws are disposed extending outwardly in radial direction, and a second coupling element, on which at least two locking claws are disposed extending inwardly in radial direction, wherein the interlocking claws and the locking claws are so arranged and dimensioned that the interlocking claws grip behind the locking claws like a bayonet catch, when the second coupling element is rotated relative to the first coupling element wherein, at least two additional interlocking claws are additionally disposed on the first coupling element, which are outwardly offset from the interlocking claws in radial direction, and wherein at least two additional locking claws are additionally disposed on the second coupling element, which are outwardly offset from the locking claws in radial direction, wherein the additional interlocking claws and the additional locking claws are so arranged and dimensioned that the additional interlocking claws grip behind the additional locking claws like a bayonet catch, when the second coupling element is rotated relative to the first coupling element, in particular for absorbing lateral powers, wherein the first coupling element includes a base plate adapted to be attached to the vehicle and the second coupling element includes an instrument plate adapted to be attached to the additional device, said coupling including a locking means for stopping a rotational movement of the first coupling element relative to the second coupling element, wherein said locking means comprises a U-shaped locking bow, the legs of which are pivotably connected via first axes with locking levers, wherein each locking lever is pivotably connected with one of the additional interlocking claws via two axes, wherein the locking bow is pre-stressed in the direction of the instrument plate by means of torsion springs, and wherein plate springs are arranged at the outer circumference of the base plate, which pre-stress the locking levers in response to the pivoting angle around the two axes into a locked position or an unlocked position.

14. A coupling according to claim 13, wherein a pivoting bow is arranged on a base plate of the stationary coupling element, which engages in a locked position with a slot of the additional interlocking claws, which slot corresponds to a slot of the additional locking claw, and which can be pivoted from the locked position into an unlocked position, and wherein a stopping lever is arranged on the base plate, which can be brought into a locked position for stopping the pivoting bow in the locked position thereof.

15. A coupling according to claim 14, wherein the base plate comprises at least one shoulder in the area of the additional interlocking claw, wherein the shoulder comprises a first bore and a second bore extending transversely to the longitudinal axis of the base plate, which bores are spaced apart from each other at a predetermined distance in the direction of the longitudinal axis, wherein the pivoting bow is connected with the base plate by means of a pivoting pin and the stopping lever by means of a pin, wherein the pivoting bow is pre-stressed in the direction of the locked position by means of a torsion spring, and wherein the stopping lever is pre-stressed at the pivoting bow in the direction of the locked position by means of a pressure spring.

16. A coupling according to claim 15, wherein the stopping lever comprises a retention nose with a retention surface, which engages a blocking surface of the pivoting bow in the locked position.

17. A coupling assembly adapted to connect an additional device to a vehicle, said coupling assembly comprising:

a first coupling element at which interlocking claws are arranged extending inwardly in radial direction, and a second coupling element at which locking claws are arranged extending outwardly in radial direction, wherein the interlocking claws and the locking claws grip behind each other like a bayonet catch, wherein the interlocking claws are arranged pair by pair, wherein each pair of interlocking claws is spaced apart by a groove, wherein the locking claws are arranged pair by pair, wherein each pair of locking claws is spaced apart by a groove, and wherein two locking elements are connected with the first coupling element for engaging with the groves, and wherein the second coupling element includes bores for accommodating the ends of a U-shaped bow, the bores being arranged so that the ends of the bow engage the locking elements for pressing the locking elements in a direction towards the first coupling element.

18. A coupling according to claim 17, wherein the locking element is pivotably connected with the first coupling element via a rotational axis and pre-stressed by means of a spring in a direction away from the first coupling element.

* * * * *